United States Patent Office 3,497,375
Patented Feb. 24, 1970

3,497,375
COATED WOODEN CONCRETE MOLD AND
A METHOD FOR MAKING SAME
Victor A. Rundle, Oakland, Calif., assignor to Chevron Research Company, San Francisco, Calif., a corporation of Delaware
No Drawing. Continuation-in-part of application Ser. No. 579,210, Sept. 14, 1966. This application Oct. 9, 1967, Ser. No. 673,971
Int. Cl. B44d 1/20
U.S. Cl. 117—5.1                                          3 Claims

ABSTRACT OF THE DISCLOSURE

Wood coatings for wooden concrete mold forms are provided having a major amount of ethylene-vinyl acetate copolymer and a minor amount of a viscous paraffinic oil having low aromatic content.

CROSS-REFERENCES TO RELATED APPLICATIONS

This application is a continuation-in-part of application Ser. No. 579,210, filed Sept. 14, 1966.

BACKGROUND OF THE INVENTION

Field of the invention

Wood is commonly used as the material for a mold when shaping concrete, for example, in building construction. A mold is formed from the wood, the concrete composition is poured, and then the wood removed once the concrete has solidified. With tall buildings presenting relatively large surface areas, reuse of the wood is necessary if costs are not to be prohibitive. Since concrete does have significant adhesion to wood, when the wood surface is not treated, the wood sticks to the concrete, marring the surface of the concrete as well as destroying the wood on removal, preventing the mold's reuse.

It has been found that by applying oil to the wood, the wood will readily release from the concrete. However, it has generally been found necessary to reoil the wood surface before each use. This is time consuming and inefficient and many ways have been taught to increase the number of times the wood may be reused before it has to be recoated.

SUMMARY OF THE INVENTION

Pursuant to this invention, coating compositions are provided for coating wood surfaces in wooden concrete mold forms, comprising from 55 to 75 weight percent of an ethylene-vinyl acetate copolymer and, correspondingly, from about 45 to 25 weight percent of a viscous paraffinic oil having low aromatic content.

DESCRIPTION OF THE PREFERRED EMBODIMENTS

As already indicated, the principal ingredients of the coating composition comprise 55 to 75 weight percent of an ethylene-vinyl acetate copolymer and correspondingly 45 to 25 weight percent of a viscous paraffinic oil, preferably 60 to 75 weight percent of the ethylene-vinyl acetate copolymer and correspondingly 40 to 25 weight percent of the viscous paraffinic oil.

Ethylene-vinyl acetate copolymer

The ethylene-vinyl acetate copolymer which finds use will generally have a melt index of from about 100 to 500, more usually from about 125 to 250. (ASTM D1238–57T.) The mole percent of vinyl acetate will generally be in the range of about 10 to 25%, more usually from about 15 to 20%, the remainder being for the most part ethylene.

Paraffinic oil

The paraffinic oil which finds use can be a variety of high naphthenic and paraffinic content oils having flash points above 400° F. and viscosities at 100° F. ($V_{100}$) of at least 450 and preferably at least 550 SUS (Saybolt Universal seconds). That is, the carbon atoms are saturated carbon atoms ($sp.^3$).

The composition of the oil should have at least 45 number percent of the carbon atoms (ndM Analysis [refractive index-density-molecular weight-method of Van Nes and Van Western]) in paraffinic chains and at least 20 number percent of the carbon atoms, and not more than 50 number percent of the carbon atoms in naphthenic rings. The remaining carbon atoms will be present in aromatic rings.

The number percent of carbon atoms in paraffin chains will generally be from about 45 to 70, while the number percent of carbon atoms in naphthenic rings will generally be from about 25 to 45, more usually from about 30 to 40.

The viscosity of the composition at 100° F. ($V_{100}$) will generally be from about 500 to 6,000 SUS, preferably from about 550 to 2,500 SUS.

Various oils may be used either by themselves or in combination with other oils. Illustrative oils include bright stock, spray stock, pale oil, neutral oil, etc. It is only necessary that the oils fulfill the composition requirements and physical properties as indicated by the above limitations. Other additives may also be included such as pigments—these materials will be present in from about 0.5 to 5 weight percent of the total composition.

Preparation and use

The compositions of this invention are readily prepared by mixing the ingredients together at elevated temperatures with agitation. Once combined, the composition may be stored for long periods of time.

The compositions are viscous and are applied directly to the wood surface. Various methods for achieving a relatively smooth coat of from about 2 to 20 mil thickness, more usually from about 5 to 10 mil thickness, may be used. Illustrative methods include a reverse roll coater with a burnishing roller, knife blade, etc.

A preferred embodiment is to first coat the wood surface with a wax-ethylene-vinyl acetate copolymer composition followed by a coat of the oil-ethylene-vinyl acetate copolymer composition. The wax copolymer composition will generally be about 50 to 65 weight percent wax, and at least 10 weight percent each of the copolymer, and a tackifying resin such as esterified rosins, polyterpene resins, vinyl toluene-styrene copolymers (Piccotex) and petroleum hydrocarbon resins. The total weight percent of copolymer and tackifying resin will be from 35 to 50 weight percent.

The waxes which find use are microcrystalline wax, paraffin wax, slack wax, etc. The preferred waxes which find use are petroleum refined waxes having less than about 10 weight percent oil, more usually less than about 5 weight percent oil. The AMP (ASTM D127–60) will generally be in the range of about 140 to 180° F., more usually in the range of about 145 to 160° F.

The ethylene-vinyl acetate copolymer will generally have a melt index of from about 1 to 50, more usually of from about 1 to 20. The mole percent of vinyl acetate will generally be about 25 to 35, more usually 26 to 32 with a corresponding amount of ethylene.

By use of this undercoating, it is found that better oil retention is obtained—the surface of the coated wood is less oiled; also, better adhesion of the oil-copolymer to the wood surface is obtained.

The wax-copolymer composition can be applied to the wood surface in the same manner as described for the oil-copolymer composition. Depending on the surface of the wood—rough or smooth—the thickness of the coating will vary from about 0.5 to 5 mil thickness. The wax-copolymer coat is ordinarily not repeated.

EXAMPLES

In order to demonstrate the effectiveness of the compositions of this invention as coatings for wooden concrete mold forms, a number of compositions were prepared. In each composition, 65 weight percent of ethylene-vinyl acetate copolymer (Elvax 420, sold by Du Pont & Co.) having a melt index in the range of 125 to 170 and containing 18 mol percent vinyl acetate was used. Three different oil compositions were employed.

In the first composition, 35 weight percent of a 230 bright stock having a viscosity of 100° F. of 5,500 S.U.S. and a viscosity at 210° F. of 231 S.U.S. was employed.

The composition was applied to the wood surface using reverse roll coating or a knife blade. The form used was 3″ x 8″ and 1″ deep. A concrete composition was prepared by using 4 parts concrete sand to 1 part portland cement, approximately 1 part water added to give close to zero slump and then the cement poured into the form. The block was allowed to cure for 2 days before removal. A 1-day period was allowed between removal and the next pour. While in the absence of any coating, the concrete sticks tightly to the wood, with the composition described above, not until the eleventh pour was there any sticking noticed and that in the center. If a third day had been permitted for curing of the concrete, even this sticking might have been avoided A second composition employed 35% of a 600 neutral oil having the following characteristics: 60% of the carbon atoms (ndM analysis) as paraffins, 36% in naphthenic rings, and the remainder in aromatic rings.

A third composition was prepared having 18% of a spray stock having the following characteristics: a viscosity of 88 S.U.S. at 100° F. and 50% of the carbon atoms (ndM analysis) as paraffin chains and 46% of the carbon atoms as naphthenic rings. Combined with the spray stock was 14 weight percent (based on the total composition) of a 205 bright stock having the following characteristics: 4,500 S.U.S. viscosity at 100° F., 66% of the carbon atoms in paraffin chains and 26% of the carbon atoms in naphthenic rings. The blend of the spray stock and bright stock had the following characteristics: 2,000 S.U.S. viscosity at 100° F., 57% of the carbon atoms in paraffin chains and 37.5% of the carbon atoms in naphthenic rings. In addition, one weight percent based on the total composition of titanium dioxide paste and 2 weight percent of an iron oxide paste were included.

The latter 2 compositions were used to prepare 5 mil and 10 mil coatings which permitted repeated use of the concrete mold without any sticking of the concrete to the mold. The compositions were applied over the previously described undercoats on 3″ x 8″ plywood panels. Seven pours were obtained with clean release at the concrete. Slight sticking began to occur on the eighth pour.

It is evident that the compositions of this invention greatly enhance the efficient use of wooden mold forms in preparing concrete slabs or other concrete objects, permitting the reuse of the wooden form numerous times without having to recoat prior to reuse.

As will be evident to those skilled in the art, various modifications on this invention can be made or followed, in the light of the foregoing disclosure and discussion, without departing from the spirit or scope of the disclosure.

What is claimed is:

1. A method for preventing adhesion of concrete to a wooden surface which comprises, as a first step, coating the wooden surface with a wax-(ethylene-vinyl acetate copolymer)-tackifying resin composition to form a film of from about 0.5 to 5 mil thickness, wherein said composition has from about 50 to 65 weight percent wax and at least 10 weight percent and not more that 40 weight percent of each of said copolymer and said tackifying resin, said wax has an AMP of from about 140 to 180° F., said copolymer has a melt index in the range of 1 to 50 and from about 25 to 35 mole percent vinyl acetate, and as a second step, coating over the above film with a composition comprising from 55 to 75 weight percent of an ethylene-vinyl acetate copolymer having a melt index of from about 100 to 500 and from 10 to 25 mole percent vinyl acetate with, correspondingly, 45 to 25 weight percent of a viscous paraffinic oil having a viscosity at 100° F. of at least 450 S.U.S.

2. A wooden concrete mold having on its inner surface a coating of from 2 to 20 mil thickness of a composition comprising from 55 to 75 weight percent of an ethylene-vinyl acetate copolymer having a melt index of from about 100 to 500 and from 10 to 25 mole percent vinyl acetate with, correspondingly, 45 to 25 weight percent of a viscous paraffinic oil having a viscosity at 100° F. of at least 450 S.U.S.

3. A wooden concrete mold having on its inner surface a first coating of from about 0.5 to 5 mil thickness of a composition having from about 50 to 65 weight percent wax and at least 10 and not more than 40 weight percent each of an ethylene-vinyl acetate copolymer and a tackifying resin, said wax having an AMP of from about 140 to 180° F., said copolymer having a melt index in the range of 1 to 50 and from 25 to 35 mole percent vinyl acetate and a second coating of from 2 to 20 mil thickness of a composition comprising from 55 to 75 weight percent of an ethylene-vinyl acetate copolymer having a melt index of from about 100 to 500 and from 10 to 25 mole percent vinyl acetate with, correspondingly, 45 to 25 weight percent of a viscous paraffinic oil having a viscosity at 100° F. of at least 450 S.U.S.

References Cited

UNITED STATES PATENTS

| 2,723,215 | 11/1955 | Biefeld et al. | 117—92 X |
| 2,863,364 | 12/1958 | Rosenquist et al. | 117—5.1 X |
| 3,010,899 | 11/1961 | Boyer | 117—161 X |
| 3,207,716 | 9/1965 | Lippoldt | 260—28.5 X |
| 3,305,382 | 2/1967 | Gordy | 117—92 X |
| 3,355,348 | 11/1967 | Lamar | 117—72 X |

FOREIGN PATENTS

| 594,248 | 3/1960 | Canada. |
| 956,831 | 4/1964 | Great Britain. |

WILLIAM D. MARTIN, Primary Examiner

MATHEW R. P. PERRONE, JR., Assistant Examiner

U.S. Cl. X.R.

106—12; 117—72, 87, 92, 148, 149; 260—28.5, 33.6